3,375,131
FLEXIBLE COATED FILM STRUCTURE AND PROCESS OF MANUFACTURE THEREFOR
Paul Gordon Schmidt, Wilmington, Del., assignor to E. I. du Pont de Nemours and Company, Wilmington, Del., a corporation of Delaware
No Drawing. Filed Mar. 29, 1963, Ser. No. 269,190
5 Claims. (Cl. 117—211)

This invention relates to electrically conductive film structures and more particularly to metal oxide coated polyimide films which are transparent and maintain electrical conductivity upon flexing.

Materials such as glass, ceramics and mica have been coated with metal oxides to provide electrical conductivity with good optical clarity. Such coatings have found utility in de-icing of windshields in aircraft and in the manufacture of electroluminescent panels, each requiring not only conductivity, but also transparency. Experience in these fields has taught that the coating must have uniformity, that is, it must be free of local imperfections or discontinuities in the electrical path.

It has been observed that fissures in the coating which are quite small can propagate quite rapidly under the heating affected by an electric current and result in the rapid failure of an entire panel. The extremely deleterious effect of such imperfections in a conductive coating on the lifetime of panels for heating and lighting has restricted such devices to rigid structures.

This limitation appeared to be a result of the inadequacy of elasticity and adhesion of the oxide coating. For example, mica coated with tin oxide fails after being flexed only a few degrees with a large radius of curvature. Microscopic fissures occur, which upon passage of an electric current cause a complete loss of electrical conductivity after a short time. Gross adhesion of the oxide coating appears to be good, which is expected since the polarizable nature of mica, as of glass, provides excellent anchorage sites, but there appears to be a deficiency in elastic properties of the coatings.

Oxide coatings have been applied to organic films for decorative purposes, and as barriers to decrease the permeability of the film to gases and vapors. These uses, however, are not so sensitive to microscopic imperfections as are electrical uses. Any minor imperfection is more or less fixed in its effect in these uses, while for electrical uses such imperfections are pernicious, as a result of their growth with use, leading to complete failure.

It is also advantageous to employ flexible transparent films in electroluminescent devices, but if these are exposed to the weather, moisture may gradually diffuse through conductive films and cause a decrease in efficiency of the unit, and lead to complete failure. A suitable element for this application should have good transparency and a high degree of moisture impermeability.

Thus, it has been impossible heretofore to provide transparent, electrically conductive coatings on flexible organic film which retains serviceability after flexing. In summary, this appears to be due to the absence of extensibility of the coating and to inadequate adhesion, microscopically, to the substrate.

It is an object of this invention to provide flexible, transparent electrically conductive film structures.

A further object of this invention is to provide a conductive film having a high resistance to the permeation of water vapor.

It is a further object of this invention to provide metal oxide coated polyimide films which are transparent and maintain electrical conductivity upon flexing. These and other objects of this invention will appear hereinafter.

These and other objects of this invention have been accomplished by the preparation of a flexible, transparent, electrically conductive film structure by vapor deposition at atmospheric pressure of a partially reduced and partially hydrolyzed metal chloride on a film of a polyimide, preferably of pyromellitic dianhydride and 4,4'-diaminodiphenylether at a temperature sufficient to maintain the film at a temperature greater than 300° C.

Although an organic film capable of withstanding a temperature greater than 300° C. can be employed in this invention, the invention is especially adapted for use with a polyimide film derived from a dianhydride of an aromatic tetracarboxylic acid and an organic diamine. Such films and their preparation are described in copending U.S. patent application Ser. No. 169,120, filed Jan. 26, 1962, now Patent No. 3,179,634 and assigned to the assignee of the present application.

The metal oxide useful in coating the film in the present invention must sublime below about 600° C. and above 300° C., be flexible, electrically conductive, substantially transparent and retain electrical conductance upon flexing the film. Preferred metal oxides which fulfill these rigid requirements are the oxides of tin and indium.

The metal oxides are coated on the film by spraying or by vapor deposition of a metal chloride solution as described in the examples, in the temperature range of 300°–600° C.

The invention can be better understood by referring to the following examples:

*Example 1*

A beaker containing 8 ml. of a solution prepared from 66 gr. $SnCl_4 5H_2O$, 23 ml. of water and 10 ml. of formaldehyde is inserted into an electrically heated oven, heated to 550° C. A 3″ x 3″ section of 1.1 mil thick polyimide film derived from pyromellitic dianhydride and 4,4'-diaminodiphenylether, supported on a metal frame, is inserted into the oven immediately after the solution and is supported over the vapors of the coating solution. The film is exposed to the vapors for 2.0 minutes.

The resistance of the coatings, as measured by a vacuum tube voltmeter, is from 16 to 40 ohms/sq. with substantially no change after flexing 20 times. The average optical transmission decrease after flexing 20 times is 11% as measured at 5,500 A. to 9,000 A. measured with a Cary spectrophotometer. Water vapor permeability by the method ASTM-D-1434-58 ("Gas Transmission of Plastic Sheeting") reveals zero water vapor permeability, as compared to an average of 263 grams/100 square meter/hour for the uncoated film in a 24 hour test.

*Example 2*

Example 1 is repeated except that the film is exposed to the vapors for 1.5 minutes.

The resistance of the coating is from 8 to 10 ohms/sq. with substantially no change after flexing 20 times. The average optical transmission decrease measured as in Example 1 is 13% while the water vapor permeability test as in Example 1 shows zero water vapor permeability.

*Example 3*

Example 1 is a repeated except that the film is exposed to the vapors for 1.0 minute.

The resistance of the coating is 30 ohms/sq. with substantially no change after flexing 20 times. The average optical transmission decrease is 3% after coating with no change as a result of flexing. There is zero water vapor permeability as shown by the water vapor permeability test of Example 1.

*Example 4*

Example 1 is repeated except indium trichloride is employed by the use of auxiliary means to heat the solution.

The film is heated to 500 to 550° C. and the solution is sprayed on one surface while maintaining the film at this temperature. The coating thus produced on the film has a low resistance approaching that of tin with the same reduction in optical transmission, but with a more apparent haze. The water vapor permeability test of Example 1 shows zero water vapor permeability.

*Example 5*

A number of flexible mica films ranging in thickness from 0.6 to 4.2 mils are coated with tin oxide by the method shown in Example 1. Initial surface resistivities are in the range from 9.0 to 18.5 ohms per square. In all cases resistivities increase substantially with bending or flexing. After 10 to 20 flexes, resistances exceed 100,000 ohms per square, with poor adhesion over the flexed areas.

All attempts to coat films of polyimides and polyethylene terephthalate with tin oxide by the process of the examples at 225° C. are ineffectual. No electrically conductive coating is obtained, instead, a white, semi-crystalline coating, which is readily wiped off, is formed.

The water vapor barrier capacity of the transparent conductive films of this invention makes these films especially adapted to electroluminescent panel construction.

The conductive coated film of the present invention is especially suitable for use in preparation of film resistance heaters of extended lifetime.

This invention has a major advantage over transparent bodies having electrically conductive coatings known to the prior art in that the structure is flexible, a property which can be achieved only with thin metal coatings, which for preparation require expensive vacuum equipment or sputtering devices, and result in coatings which are not transparent. The flexibility and conductivity enable adjustment and conformity of the conductive structure to complex shapes.

In addition to more conventional heating and electroluminescent uses, heating devices constructed according to the present invention are especially adapted as components of precision instrumets. For example, it has been advantageously as a sample heating element in a nuclear magnetic resonance spectrometer; in this use it is characterized as causing a minimum of interference with a sensitive detection system of the spectrometer.

What is claimed is:

1. A coated film structure comprising: a base film of a polyimide derived from a dianhydride of an aromatic tetracarboxylic acid and an organic diamine and coated on at least one surface of said film a flexible, electrically conductive, substantially transparent metal oxide coating, said coating retaining electrical conductance upon flexing said film.

2. The structure of claim 1 wherein the dianhydride is pyromellitic dianhydride and the organic diamine is 4,4'-diaminodiphenylether.

3. The structure of claim 2 wherein the metal oxide is an oxide of a metal selected from the group consisting of tin and indium.

4. A process comprising: heating a film of a polyimide derived from a dianhydride of an aromatic tetracarboxylic acid and an organic diamine to a temperature within the range of 300 to 600° C. and applying to at least one surface of said film at said temperature and atmospheric pressure a partially reduced partially hydrolyzed metal chloride to produce a metal oxide coating on said film surface which is flexible, electrically conductive and substantially transparent.

5. The process of claim 4 wherein the metal chloride is selected from the group consisting of tin chloride and indium chloride.

References Cited

UNITED STATES PATENTS 3,118,786  1/1964  Katchman et al. _____ 117—211

FOREIGN PATENTS 207,058  1/1960  Austria.
353,049  5/1961  Switzerland.

OTHER REFERENCES

RCA Technical Note No. 71, Messineo, December 1957.

WADC, Technical Report, 53,378, Dalin et al. (January 1954), page 24.

WILLIAM L. JARVIS, *Primary Examiner.*

ALFRED L. LEAVITT, *Examiner.*